United States Patent Office 3,413,379
Patented Nov. 26, 1968

3,413,379
PROCESS FOR THE PREPARATION OF LINEAR THERMOPLASTIC MIXED POLYESTERS HAVING SOFTENING POINTS ABOVE 100° C.
Gerhard Schade, Witten-Bommern, and Franz Blaschke, Witten (Ruhr), Germany, assignors to Chemische Werke Witten G.m.b.H., Witten (Ruhr), Germany
No Drawing. Filed Jan. 14, 1965, Ser. No. 425,626
Claims priority, application Germany, Jan. 17, 1964, C 31,908
The portion of the term of the patent subsequent to Jan. 17, 1984, has been disclaimed
9 Claims. (Cl. 260—860)

ABSTRACT OF THE DISCLOSURE

Linear thermoplastic polyesters having softening points above 100° C. are prepared by transesterification and polycondensation of diaryl terephthalate and/or diaryl isophthalate, and optionally, up to 10 mole percent of a diaryl carbonate or oxalate, with dihydric phenols. As soon as the melt viscosity reaches a value of from about 2000 to 4000 poises, about 15 to 120% by weight, based on the total amount of diaryl esters employed, of a linear polyester having a viscosity of 0.1 to 0.5 dl./g. and based upon terephthalic and/or isophthalic acid and diprimary alcohols are added thereto. The condensation is subsequently continued until the reaction mixture attains a viscosity of 0.5 dl./g.

This invention relates to linear thermoplastic polyesters. More particularly, it relates to the preparation of linear thermoplastic mixed polyesters. Even more particularly, the invention relates to the preparation of linear thermoplastic mixed polyesters having softening points of above 100° C.

In accordance with patent application Ser. No. 397,618 of Schade et al., filed on Sept. 18, 1964, linear thermoplastic mixed polyesters having softening points above 100° C. are prepared by transesterification and polycondensation of diaryl terephthalate and/or diaryl isophthalate with equimolecular amounts of dihydric phenols, whereby 15 to 120% by weight, relative to the total quantity of diaryl esters employed, of a linear thermoplastic polyester having terephthalic acid or isophthalic acid units or mixtures thereof as well as the residues of diprimary dialcohols are added to the reaction mixture. The latter-mentioned polyester containing the dialcohol residues is added to the reaction mixture at temperatures of up to about 280° C. as soon as the melting viscosity of the reaction mixture has reached a value of about 2000 to 4000 poises under the reaction conditions described therein. Thereafter, the polycondensation reaction is continued in the presence of the added polyester until the reaction mixture attains a viscosity number of about 0.5 dl./g.

With this process, linear thermoplastic mixed polyesters having softening points or temperatures of above 100° C. can be easily obtained in conventional stirring autoclaves while possessing the desired degrees of polycondensation, required for obtaining good mechanical properties.

The preferred dihydric phenol to be utilized in the above-described process is bisphenol A. The process is carried out in the presence of known conventional additives, such as the appropriate catalysts and stabilizing agents.

In accordance with the process in application Ser. No. 397,618, up to about 10 mole percent of the diaryl terephthalate and/or diaryl isophthalate may be replaced by at least equimolecular amounts of a diaryl carbonate, a diaryl oxalate, or mixtures thereof. Diaryl carbonates and oxalates which may be utilized include, for example, the phenyl, cresyl, xylenyl and naphthyl esters thereof.

Diaryl esters of terephthalic and/or isophthalic acid to be utilized are, for example, the phenyl, cresyl, xylenyl and naphthyl esters.

Useful as dihydric phenols in accordance with this process are, for example, bisphenol A, resorcinol and hydroquinone.

Of significance as residues of diprimary dialcohols operative in the described process are glycols, such as, for example, ethylene glycol, polymethylene glycols, 2,2-dimethylpropane diol, hexahydroxylylene glycols, di-, tri-, tetra-, and pentaethylene glycols, as well as the hydroxyethylation products of disphenol A, hydroquinone and resorcinol.

In accordance with the process of the present invention, it has been found that the process of the above-mentioned patent application may be improved if the polyester containing the dialcohol residues added to the reaction mixture has a viscosity number which is between 0.1 and 0.5 dl./g. and if, furthermore, the polycondensation reaction is continued in the presence of this addition until the reaction mixture reaches a viscosity number above about 0.5 dl./g. As pointed out above, the polyester added to the reaction mixture is added as soon as the melting viscosity of the reaction mixture under the reaction conditions utilized reaches a value of about 2000 to 4000 poises.

It has been found that valuable mixed polyesters having softening points above 100° C. and having good mechanical properties such as great hardness and good impact resistance and notch toughness are obtained by the use of the improved process of the present invention. In order that the preparation of sufficiently high molecular weight mixed polyesters having good mechanical properties can be had with certainty, it is necessary that the added linear polyesters containing the dialcohol residues have a viscosity number of at least about 0.1 dl./g. at a concentration of 1 gram of polyester in 100 ml. of a solvent mixture made up of 60 parts by weight of phenol and 40 parts by weight of tetrachloroethane at 25° C.

The improvements and advantages gained as a result of the use of such relatively low molecular weight polyesters as additives to the reaction mixture reside in the fact that the melting viscosity of the reaction mixture is much more significantly lowered by the addition thereof than in the case of the addition of polyesters which are already thermoplastic, i.e., those that have a viscosity number above 0.5 dl./g. Thus, that portion of the reaction time which creates particular difficulties with regard to process techniques because of the high melting viscosity of the reaction mixture is greatly shortened as a result of the use of the low molecular weight polyesters containing dialcohol residues in accordance with the process of the present invention.

Accordingly, one of the objects of the present invention is to provide an improved process for the preparation of linear thermoplastic mixed polyesters having softening points or temperatures of above 100° C. which overcomes the disadvantages and deficiencies of the prior art methods.

Another object of the present invention is to provide a process for the preparation of linear thermoplastic mixed polyesters having softening points or temperatures of above 100° C. wherein desired degrees of polycondensation of the polyester, required for obtaining good mechanical properties, can be easily obtained in conventional stirring autoclaves.

A further object of the invention is to provide a process for the preparation of linear thermoplastic mixed polyesters having softening points or temperatures of above 100° C. which has good reproducibility and which is devoid of the uncertainties of formulation of proportions of reactants encountered with the prior art processes.

A still further object of the present invention is to provide a process for the preparation of linear thermoplastic mixed polyesters having softening points or temperatures of above 100° C. which significantly reduces the difficulties encountered in processing and preparing such polymers.

These and other objects of the present invention will become apparent to those skilled in the art from a reading of the following specification and claims.

It has already been known to prepare mixed polyesters from polycarbonates whereby, for example, suitable quantitative amounts of relatively low molecular weight polyethylene terephthalate are heated together with bisphenol A and diphenyl carbonate to give high molecular weight polyester carbonates having good properties. Surprisingly, it was found that this process cannot be transferred analogously to the preparation of the mixed polyesters of the present invention. The presence of low molecular weight polyesters containing dialcohol residues at the beginning of the reaction, when employing diaryl terephthalate and/or diaryl isophthalate, always leads to failures in obtaining the desired reaction product even if a sufficient amount of diaryl carbonate is present to offset or counterbalance with certainty any disturbances in the equivalence of the reactants. If, on the other hand, the addition of the low molecular weight polyesters containing the dialcohol residues takes place at the time in the reaction specified by the process of the present invention, in other words, only when the reaction mixture of diaryl esters and diphenols has obtained a melting viscosity of about 2000 to 4000 poises at about 280° C., the desired sufficiently high molecular weight mixed polyesters having good mechanical properties are obtained with certainty.

Thus, the invention herein constitutes the use of certain low molecular weight polyesters, i.e., those having a viscosity number of between about 0.1 and 0.5 dl./g., as an additive to the reaction mixture of diaryl terephthalate and/or diaryl isophthalate with dihydric phenols at a certain specified point during the course of the reaction.

The improved process for the preparation of the mixed polyesters in accordance with the present invention is described in further detail on the basis of the following examples without, however, being limited thereto.

EXAMPLE 1

In a 100 ml. round flask equipped with stirrer and descending cooler, 15.9 grams of diphenyl terephthalate (0.05 mole), 14.3 grams of diphenyl isophthalate (0.045 mole) and 1.76 grams of diphenyl carbonate (0.0055 mole) were transesterified, in the presence of 30 milligrams each of antimony oxide and triphenyl phosphite, with 22.8 grams of bisphenol A (0.1 mole) for 2½ hours at 180° C. The temperature was raised to 280° C. for another 2½ hours, and the polycondensation was carried out at this temperature for 15 minutes while applying a vacuum of 2–0.5 torr. Added to this very tough melt was 10.8 grams of granulated polyethylene terephthalate having a viscosity of 0.131. The polycondensation was then continued for another 2 hours at a vacuum of 0.2 torr at 280° C. A faintly turbid, almost colorless product was obtained, having a viscosity number of 0.645 and a softening point of 145° C. (determined with the aid of a penetrometer having a needle cross section of 1 mm.² and a total load of 350 grams; depth of penetration 0.1 mm.). The product could be nailed without developing cracks and could be mechanically sawed and drilled without displaying melting or sintering marks.

When the same polyethylene terephthalate was added to the batch in the same quantity, but at the beginning of the reaction, the procedure being otherwise the same as described hereinabove, the resulting product—having a viscosity number of only 0.331 dl./g.—was so brittle that it could be easily reduced to small pieces by blows with a hammer.

When the amount of diphenyl carbonate was increased to 2.14 grams (0.01 mole) and 3.2 grams (0.015 mole), respectively, and the polyethylene terephthalate was added at the beginning of the reaction to the otherwise identical batch, brittle products were again obtained having a viscosity number of 0.495 and 0.419 dl./g., respectively. These brittle products did not display a sufficient impact resistance even with a continued polycondensation reaction.

EXAMPLE 2

The quantities of diphenyl terephthalate, diphenyl isophthalate, bisphenol A, antimony oxide and triphenyl phosphite indicated in Example 1 were polycondensed with 1.2 grams of diphenyl carbonate (0.0056 mole) for such a length of time until stirring of the batch was just barely possible. Then, 14.4 grams of polyethylene terephthalate having a viscosity number of 0.3 dl./g. was added to the reaction mixture and the polycondensation reaction was continued for 4½ hours at 280° C. and 0.2 torr. The end product had a viscosity number of 0.574 and could not be reduced to small pieces by blows with a hammer. The softening point of the product was 130° C.

EXAMPLE 3

The batch and the procedure of this example corresponded to the formulation given in Example 2 with the exception that, instead of polyethylene terephthalate, 14.4 grams of poly[2,2-dimethylpropylene terephthalate-isophthalate (1:1)] was employed which had a viscosity number of 0.248 dl./g. After 4 hours at 280° C. and 0.1 torr, a very tough faintly yellowish product was obtained with a viscosity number of 0.979 dl./g. and a softening point of 128° C.

While the invention has been described specifically in the examples with the use of antimony oxide and triphenyl phosphite, it is to be understood that the invention is not to be limited thereto and the catalysts and stabilizing agents known in the art and conventionally utilized in the instant process are intended to be included within the scope of the invention. Examples of such catalysts include alkali metal and alkaline earth phenolates, zinc oxide, and the like. Illustrative stabilizers, mentioned only by way of example, include aryl phosphites, alkyl phosphites, and mixed alkyl aryl phosphites.

The invention being thus described, it will be obvious that the same may be varied in many ways. Such variations are not to be regarded as a departure from the spirit and scope of the invention and all such modifications are intended to be included within the scope of the following claims.

We claim:

1. In a process for the preparation of linear thermoplastic mixed polyesters having softening temperatures of above 100° C. which comprises heating a mixture comprising 0 to 100 mole percent of a diaryl terephthalate, 100 to 0 mole percent of diaryl isophthalate, 0 to 10 mole percent of a diaryl ester selected from the group consisting of diaryl carbonates and diaryl oxalates, the total amount of said diaryl terephthalate and diaryl isophthalate in said mixture being from 90 to 100 mole percent and the total mole percent of said diaryl terephthalate, said diaryl isophthalate and said diaryl ester being equal to 100 mole percent, and about 100 mole percent of a dihydric phenol up to about 320° C. to effect a transesterification and polycondensation to produce a mixed polyester, the improvement which comprises adding to said mixture as soon as the melting viscosity thereof reaches a value of from about 2000 to 4000 poises under the reaction conditions employed about 15 to 120% by weight, based on the total amount of diaryl esters employed, of a linear polyester consisting of units of residues of a diprimary dialcohol and residues of an acid selected from the group consisting of terephthalic acid, isophthalic acid and mixtures thereof, said polyester having a viscosity number of between about 0.1 and 0.5 dl./g., and subsequently continuing the polycondensation reaction until the reaction mixture attains a viscosity number above about 0.5 dl./g., said viscosity number being determined at 25° C. with a concentration of 1 gram of polyester in 100 ml. of a solvent mixture consisting of 60 parts by weight of phenol and 40 parts by weight of tetrachloroethane.

2. A process according to claim 1, wherein said mixture additionally contains a suitable transesterification and polycondensation catalyst.

3. A process according to claim 1, wherein said mixture additionally contains a suitable stabilizing agent therefor.

4. A process according to claim 1, wherein said dihydric phenol is selected from the group consisting of bisphenol A, resorcinol and hydroquinone.

5. A process according to claim 4, wherein said dihydric phenol is bisphenol A.

6. A process according to claim 1, wherein said diaryl group is selected from the group consisting of phenyl, cresyl, xylenyl and naphthyl groups.

7. A process according to claim 1, wherein said added linear polyester is polyethylene terephthalate.

8. A process according to claim 1, wherein said diprimary dialcohol is selected from the group consisting of ethylene glycol, polymethylene glycols, 2,2-dimethylpropane diol, hexahydroxylylene glycols, diethyl glycol, triethylene glycol, tetraethylene glycol, pentaethylene glycol, hydroxyethylation products of bisphenol A, hydroxyethylation products of hydroquinone and hydroxyethylation products of resorcinol.

9. A process for the preparation of a linear thermoplastic mixed polyester having a softening temperature of above 100° C. which comprises heating a mixture comprising 0 to 100 mole percent of diphenyl terephthalate, 100 to 0 mole percent of dihphenyl isophthalate, 0 to 10 mole percent of a diaryl ester selected from the group consisting of diphenyl carbonate and diphenyl oxalate, the total amount of said diaryl terephthalate and diaryl isophthalate in said mixture being from 90 to 100 mole percent and the total mole percent of said diphenyl terephthalate, said diphenyl isophthalate and said diaryl ester being equal to 100 mole percent, about 100 mole percent of bisphenol A, a transesterification catalyst, and a suitable stabilizer to about 280° C., adding to said mixture as soon as the melting viscosity thereof reaches a value of from about 2000 to 4000 poises at about 280° C. about 15 to 120% by weight, based on the total amount of diaryl esters employed, of polyethylene terephthalate having a viscosity number of between about 0.1 and 0.5 dl./g., and subsequently continuing the reaction by heating until the reaction mixture attains a viscosity number above about 0.5 dl./g., said viscosity number being determined at 25° C. with a concentration of 1 gram of polyester in 100 ml. of a solvent mixture consisting of 60 parts by weight of phenol and 40 parts by weight of tetrachloroethane.

References Cited

UNITED STATES PATENTS

| 2,692,249 | 10/1954 | Lincoln | 260—860 |
| 3,166,606 | 1/1965 | Reinking et al. | 260—860 |
| 3,218,372 | 11/1965 | Okamura et al. | 260—860 |
| 3,299,172 | 1/1967 | Schade et al. | 260—860 |

FOREIGN PATENTS 1,287,519  2/1962  France.

MURRAY TILLMAN, *Primary Examiner.*

J. T. GOOLKASIAN. *Assistant Examiner.*